United States Patent [19]

Craft

[11] Patent Number: 4,934,672

[45] Date of Patent: Jun. 19, 1990

[54] LOCKING CYLINDER HYDRAULIC WORK SUPPORT

[75] Inventor: Roger L. Craft, Emporia, Kans.

[73] Assignee: Vektek, Inc., Emporia, Kans.

[21] Appl. No.: 308,200

[22] Filed: Feb. 8, 1989

[51] Int. Cl.$^5$ .............................................. B23G 3/08
[52] U.S. Cl. ...................................... 269/22; 269/310
[58] Field of Search .................. 269/20, 22, 27, 30, 269/32, 289, 287, 296, 309, 310; 188/67, 129; 279/2, 4, 1 R, 1 E, 41; 53/357

[56] References Cited

U.S. PATENT DOCUMENTS

| | | | |
|---|---|---|---|
| 3,542,354 | 11/1970 | Fitzpatrick | 269/22 |
| 3,729,185 | 4/1973 | Roeske | 269/310 |
| 4,743,001 | 5/1988 | Craft . | |

FOREIGN PATENT DOCUMENTS

| | | | |
|---|---|---|---|
| 1216183 | 5/1966 | Fed. Rep. of Germany | 53/357 |
| 2338903 | 2/1974 | Fed. Rep. of Germany | 269/310 |
| 1271132 | 7/1961 | France | 53/357 |

*Primary Examiner*—Robert C. Watson
*Attorney, Agent, or Firm*—Hovey, Williams, Timmons & Collins

[57] ABSTRACT

A hydraulic work support apparatus includes a plunger that is axially movable between a loaded position and an unloaded position and that is adapted to support a compressive load at one axial end thereof. The apparatus also is provided with structure for retaining the plunger in the loaded position, the plunger retaining structure including a tubular sleeve provided with a plunger-engaging segment having a first end adjacent the one axial end of the plunger and a second end remote from the first end. The plunger-engaging segment may be forced radially inward into pressing contact with the plunger to exert a friction force on the plunger which prevents the plunger from moving while in the loaded position. The friction force experienced by the sleeve when pressing contact exists between the sleeve and the plunger has a minimum magnitude at the first end of the plunger-engaging segment and a progressively larger magnitude toward the second end of the segment. The tubular sleeve includes a wall having a thickness which increases between a minimum thickness at the first end of the segment and a maximum thickness at the second end of the segment, the increase in the thickness of the sleeve being representative of the increase in the magnitude of the friction force experienced by the sleeve between the first and second ends of the plunger-engaging segment.

13 Claims, 1 Drawing Sheet

LOCKING CYLINDER HYDRAULIC WORK SUPPORT

Background of the Invention

1. Field of the Invention

The present invention relates generally to work support devices and, more particularly, to a work support device having a plunger axially shiftable within a bore of a housing, and a tubular sleeve for retaining the plunger in a desired axial position within the bore.

2. Discussion of the Prior Art

In order to support a work piece at an intermediate location during operations carried out on the work piece, work support tools are employed which include an axially movable plunger that is longitudinally shiftable between an unloaded position out of contact with the work piece, and a loaded position in pressing contact with the work piece. The plunger is supported in a housing provided with a locking device which locks the plunger in any desired axial position thereof in order to prevent the plunger from releasing its hold on the work piece during the operations being carried out on the work piece.

One example of this known type of work support apparatus is illustrated in U.S. Pat. No. 4,743,001, to the inventor of the presently disclosed invention, and this patent is incorporated in the present application by this reference thereto. Briefly, in U.S. Pat. No. 4,743,001, a work support apparatus is disclosed as including a base having a threaded recess in which a cylindrical housing is received. A tubular sleeve is also received in the base and is arranged concentric with the cylindrical housing. The tubular sleeve in turn receives a plunger which is shiftably movable within the sleeve between an unloaded and a loaded position. Upon shifting of the plunger, pressure is delivered to a space formed between the cylindrical housing and the sleeve, and the sleeve is resiliently biased against the side of the plunger to hold the plunger in the position to which it has been shifted. When the position of the plunger is to be changed, the pressure is relieved from the space between the housing and the sleeve, and the plunger is shifted to a new position.

When the plunger is positioned in the loaded position and the sleeve biased into pressing contact with the plunger, the sleeve experiences a force equal to the compressive load exerted on the plunger by the work piece. This force experienced by the sleeve is a friction force and varies along the length of the sleeve in an increasing manner between the upper and lower ends of the sleeve by an amount proportional to the total area of contact between the sleeve and the plunger.

Thus, at the upper edge of the sleeve, the force exerted on the sleeve by the frictional engagement between the sleeve and the plunger is theoretically zero because at the upper edge of the sleeve there is no surface area above the edge which is in contact with the plunger. At any point of interest intermediate the upper and lower ends of the sleeve, the force experienced by the sleeve in the region between the upper end of the sleeve and the point of interest is equal to the friction force exerted on the sleeve in that region, which in turn is proportional to the area of the region in contact with the plunger. Thus, the force experienced by the sleeve is very small at the upper end of the sleeve and is equal at the lower end to the entire magnitude of the compressive load applied to the plunger.

In the apparatus disclosed in U.S. Pat. No. 4,743,001, as well as in other known work support devices, the sleeve employed to hold the plunger includes a wall having a constant thickness along the segment which engages the plunger when pressure is delivered to the space between the sleeve and the housing. In these devices, the thickness of the sleeve wall in the plunger-engaging segment is designed to withstand a predetermined maximum compressive load applied to the plunger. If the wall of the sleeve is not thick enough to support the predetermined maximum load, and that load is applied to the plunger, the frictional forces exerted on the sleeve by the engagement of the sleeve with the plunger will become too large for the sleeve to support and the sleeve will be crushed by the excessive force.

However, in the known devices, it is also a concern that the sleeves not be constructed too thick since the device becomes less sensitive to pressure changes in the space between the sleeve and housing as the thickness of the wall increases, and it is desirable to give the device as much sensitivity as possible. For example, if a sleeve is sensitive to pressure changes in the space between the sleeve and the housing, the sleeve will begin to exert pressure on the plunger and hold it in place when only a small pressure is delivered to the space. Thus, the sleeve begins to hold the plunger in place at an earlier time than a sleeve which is less sensitive to such pressures. In view of the competing objects of providing a predetermined load capacity while giving as much sensitivity as possible in the known devices, it is clear that the sensitivity of the devices may not be improved without decreasing the supporting ability thereof.

Objects and Summary of the Invention

It is an object of the present invention to provide a work support apparatus which overcomes the deficiencies of the known devices and which possesses an increased sensitivity, yet is able to support the same maximum compressive load as the known devices.

According to the present invention, as with the known devices, a hydraulic work support apparatus includes a plunger that is axially movable between a loaded position and an unloaded position and that is adapted to support a compressive load at one axial end thereof. The apparatus also is provided with structure for retaining the plunger in the loaded position, the plunger retaining structure including a tubular sleeve provided with a plunger-engaging segment having a first end adjacent the one axial end of the plunger and a second end remote from the first end. The plunger-engaging segment may be forced radially inward into pressing contact with the plunger to exert a friction force on the plunger which prevents the plunger from moving while in the loaded position. The friction force experienced by the sleeve when pressing contact exists between the sleeve and the plunger has a minimum magnitude at the first end of the plunger-engaging segment and a progressively larger magnitude toward the second end of the segment.

In accordance with the invention, the tubular sleeve includes a wall having a thickness which increases between a minimum thickness at the first end of the segment and a maximum thickness at the second end of the segment, the increase in the thickness of the sleeve being representative of the increase in the friction force experienced by the sleeve between the first and second ends of the plunger engaging segment.

By this construction, several advantages are realized. For example, by providing the sleeve with a wall having a thickness which increases between a minimum thickness at the upper end of the sleeve and a maximum thickness at the lower end thereof, the wall is given a suitable thickness at the lower end thereof to support the full compressive load of the plunger, while the wall is made thinner near the upper end thereof to improve the sensitivity of the device.

In different embodiments of the device, different variations in wall thicknesses along the length may be employed. For example, theoretically, it would be ideal for the sleeve to have a constantly tapered wall which is thickest at the lower end thereof and comes to a tapered edge at the upper end thereof. However, due to construction restraints, a preferred construction includes a sleeve having an upper portion having a constant wall thickness capable of supporting the friction force experienced by the portion, and a lower portion having a wall thickness larger than the thickness of the upper portion for supporting the increased friction forces experienced by the sleeve near the lower end thereof. The lower portion preferably is tapered so as to present as thin a wall as possible at each point along the sleeve's length to support the friction force experienced by the sleeve at that point. In this way, the sensitivity of the sleeve is effected in the least critical manner.

Brief Description of the Drawing Figures

A detailed description of the preferred embodiment of the invention will be described below with reference to the attached drawing figures, wherein.

Detailed Description of a Preferred Embodiment

Figure 1:
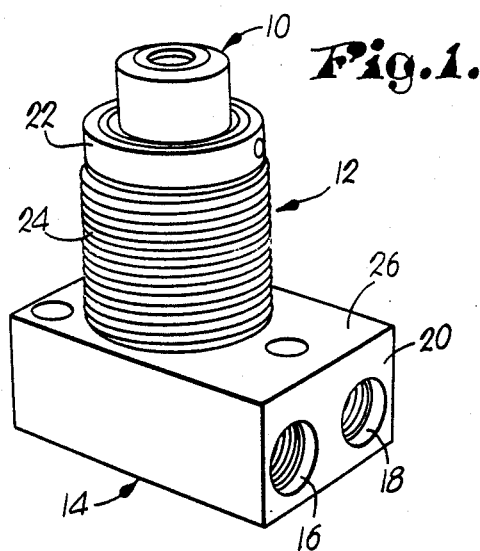
FIG. 1 is a perspective view of a work support apparatus made in accordance with the present invention.

A work support apparatus constructed in accordance with the present invention is illustrated in FIG. 1. As shown in the figure, the apparatus includes a plunger 10 and plunger-retaining means 12. The plunger-retaining means 12 includes a rectangular base 14 having an air-inlet port 16 and an oil-inlet port 18 formed in one side wall 20 thereof, and a cylindrical housing 22 having a threaded outer surface 24 and being received in an upper side 26 of the base 14. The housing 22 includes a central bore 28, shown in FIG. 2, in which the plunger 10 is shiftably movable between a lowered unloaded position and an upper loaded position in a manner to be described more fully below.

Figure 2:
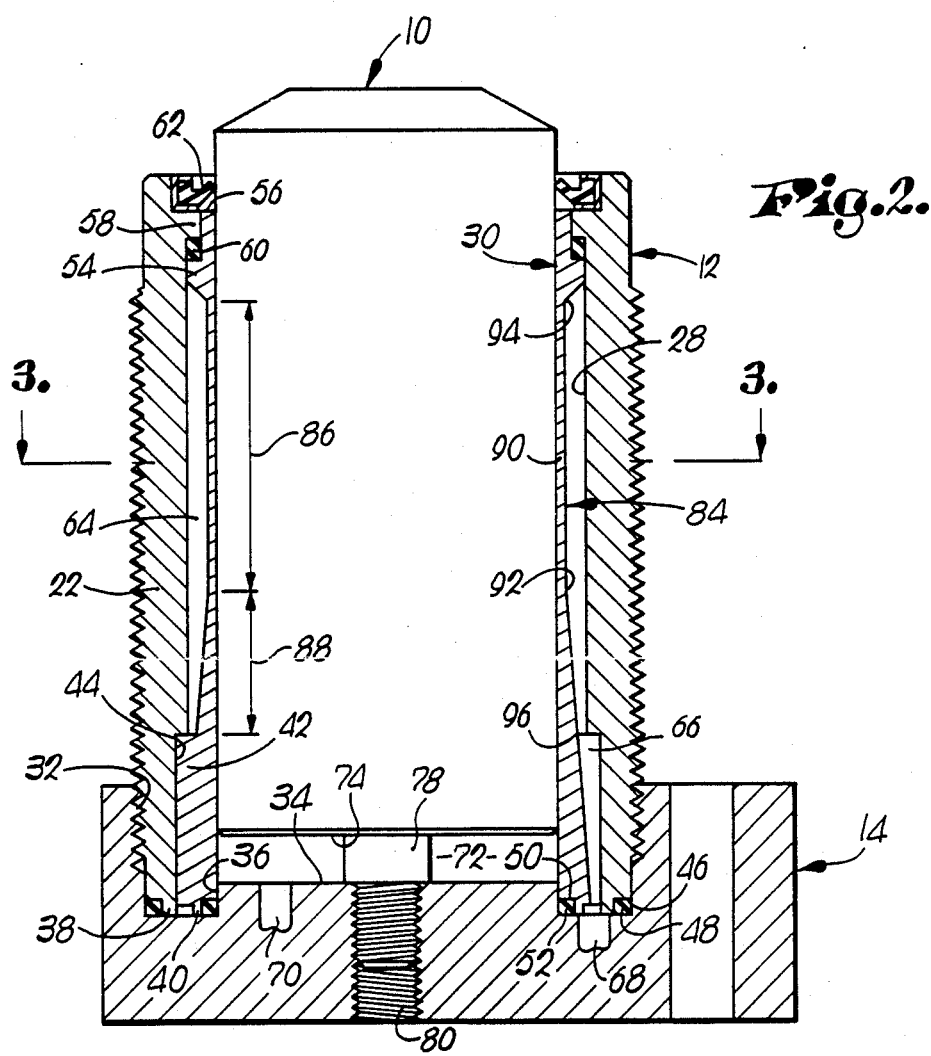
FIG. 2 is a side-sectional view of the work support apparatus shown in FIG. 1.

The plunger 10 and retaining means 12 are shown in detail in FIG. 2, where the retaining means is illustrated to further include a tubular sleeve 30 arranged concentric with the cylindrical housing 22 and mounted along with the housing in the base 14. The base is provided with a recess having a threaded outer wall 32 and a bottom wall 34 having an annular groove 36 extending along the outer circumference thereof. A lower end 38 of the housing 22 and a lower end 40 of the sleeve 30 are received in the groove 36. The threaded surface 24 of the housing engages the threaded outer wall 32 of the recess to hold the housing 22 in place on the base 14, and the tubular sleeve 30 is held in place on the base 14 by a lower flange 42 provided at the lower end 40 of the sleeve which is partially received in an annular radial groove 44 formed at the lower end 38 of the housing 22.

The cylindrical housing 22 includes an annular cut-out section 46 at the lower end 38 thereof which receives a sealing element 48, such as a rubber O-ring. This sealing element 48 fits in the cut-out section 46 and seals any space between the housing 22 and the base 14. The sleeve 30 is also provided with a cut-out section 50 at the lower end 40 thereof which is adapted to receive a sealing element 52 for sealing any space existing between the sleeve 30 and the base 14. The sleeve 30 is further provided with a radially outward directed upper flange 54 near an upper end 56 thereof, and the housing 22 includes a radially inward directed flange 58 which is axially displaced from the flange 54 of the sleeve, the two flanges 54, 58 defining a space in which a further sealing element 60 is retained to seal the plunger-retaining means 12 against leakage at the upper end of the housing. An additional wiping element 62 is also provided at the upper end of the housing to prevent any foreign materials from entering the space existing between the plunger 10 and the sleeve 30 when the sleeve is in an unloaded position spaced from the plunger This small gap which exists between the plunger and the sleeve permits free relative sliding movement of the plunger between its loaded and unloaded positions.

An annular space 64 is defined between the sleeve 30 and the cylindrical housing 22 and between the upper and lower flanges 42, 54 of the sleeve 30. This space 64 is communicated with the oil-inlet port 18 through an axial oil passage 66 extending through the lower flange 42 of the sleeve and an oil-inlet passage 68 extending between the oil port 18 and the bottom wall 34 of the recess. Oil is delivered through the passages 66, 68 to the annular space 64 to force the sleeve 30 radially inward into pressing contact with the plunger 10 in a manner to be described below.

Figure 3:
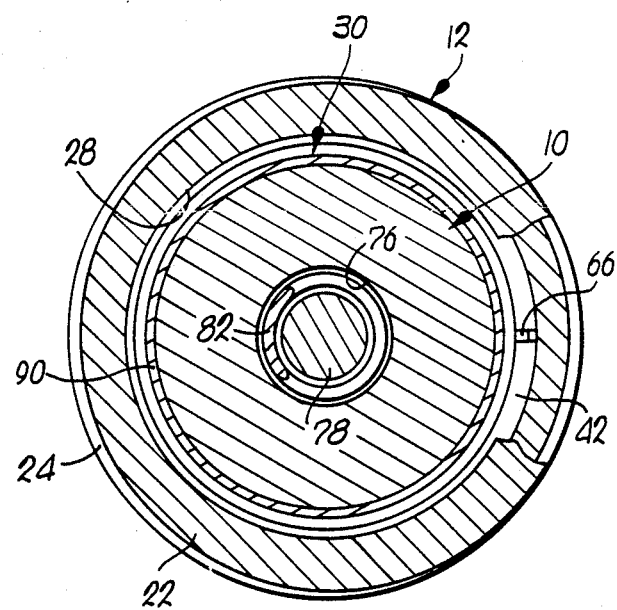
FIG. 3 is a cross-sectional view of the work support apparatus taken along line 3—3 of FIG. 2.

The air-inlet port 16 is connected to the recess of the base 14 through an air-inlet passage 70 in the base 14 which opens into a space 72 between a bottom wall 74 of the plunger 10 and the bottom wall 34 of the recess. Air is passed through the passage 70 to force the plunger 10 to move axially from an unloaded position to a loaded position. As shown in FIG. 3, the plunger 10 includes a central bore 76 in which a threaded member 78 is received. The threaded member 78 is held stationary on the base 14 by being in threaded engagement with a hole 80 provided in the bottom wall 34 of the recess, and includes an upper flange which is not shown in the drawing. The central bore 76 of the plunger 10 includes an inner radial flange, also not shown, at the lower end thereof, and a compression spring 82 is disposed concentric with the threaded member 78 in the bore 80 between the inner radial flange and the upper flange of the threaded member. Thus, the compression spring 82 is compressed when the plunger 10 moves upward with respect to the threaded member 78 and biases the plunger toward the lowered unloaded position.

Returning to FIG. 2, the segment 84 of the sleeve 30 which extends the entire length of the distance 86 and 88 shown FIG. 2, and which is disposed radially inward of the annular space 64 is the segment which presses against the plunger 10 when pressure is delivered to the annular space 64. This plunger-engaging segment 84 includes a wall 90 having a wall thickness which is not constant along its entire length. Instead, in the preferred embodiment, the wall 90 of the plunger-engaging segment 84 includes two portions: a constant thickness portion extending along the length 86 between an upper end 94 of the segment 84 and a transition point 92 which is located between the upper end 94 and a lower end 96 of the segment, and a variable thickness portion extending along the length 88 between the transition point 92 and the lower end 96 of the segment 84. In the embodiment illustrated, the variable thickness portion includes a wall which is tapered from the lower end 96 toward the transition point 92. However, it is within the scope of the invention to vary the wall thickness in other ways, such as to provide a stepped wall in place of the variable thickness portion.

In operation, air is delivered to the space 72 between the plunger 10 and the bottom wall 34 of the recess in the base 14 through the air-inlet passage 70, and the plunger 10 is forced upwardly against the action of the compression spring 82 into engagement with a piece of work which is to be supported during some operation thereon. The amount of air pressure delivered to the space 72 is controlled so that a predetermined holding pressure develops between the plunger 10 and the piece of work. Once the plunger is in the loaded position, oil is delivered to the annular space 64 adjacent the plunger-engaging segment 84 and the sleeve 30 is urged into pressing contact with the plunger 10.

The sleeve 30 is preferably formed of a flexible material such as stainless steel or aluminum in order that the sleeve be capable of elastic deformation between an unloaded position spaced from the plunger 10 and a loaded position in engagement with the plunger. Once sufficient pressure has built up in the annular space 64 to urge the sleeve wall 90 into contact with the plunger 10, a friction force develops between the sleeve 30 and plunger 10 which acts to resist downward movement of the plunger under the compressive load. As more pressure is delivered to the annular space 64, the radial force exerted on the plunger by the sleeve increases until the friction force is sufficient to retain the plunger 10 in its loaded position.

Once work is complete on the piece of work being supported by the apparatus, pressure in the annular space 64 is relieved and the sleeve 30 is allowed to elastically return to the unloaded position out of contact with the plunger 10. The plunger 10 is returned to the unloaded lowered position by the force of the compression spring 82 and is then ready for a subsequent support operation.

In accordance with the invention, the wall of the sleeve 30 in the constant thickness portion of the plunger-engaging segment 84 is preferably formed of a thickness which would be too thin, if provided along the entire length of the plunger-engaging segment 84, to support the maximum compressive load for which the work support is designed. For example, as compared with a known work support apparatus having a constant thickness sleeve, the preferred embodiment of the inventive apparatus is provided with a sleeve having a thickness in the constant thickness portion which is 20%–25% thinner than the thickness of the sleeves of the known devices. In this manner, the sleeve is deformed by smaller pressures in the annular space 64 and engages the plunger 10 sooner than a sleeve of a known device provided with a constant thickness. Thus, the inventive apparatus begins positively holding the work piece at lower pressures than known constructions.

For a constant thickness portion of any given wall thickness, a designer of a work support apparatus constructed in accordance with the preferred embodiment can determine the ideal length of the constant thickness portion by considering the constant thickness portion as a separate sleeve isolated from the remainder of the device. Knowing the predetermined maximum compressive load to be supported by the sleeve, the designer calculates, in a known manner, the friction force acting on the portion for any given length of the portion relative to the total length of the plunger-engaging segment, and the axial compressive load that would crush the portion for that given length. Thereafter, by comparing these two relationships, the designer is able to determine, in a known manner, the optimum length of the constant thickness portion for the given wall thickness. In the preferred embodiment, where the constant thickness portion has a wall thickness 20%–25% thinner than known devices, it has been found that the preferred length 86 of the constant thickness portion is substantially two-thirds of the total length of the plunger-engaging segment 84.

Once the wall thickness and length of the constant thickness portion of the sleeve are determined, it is possible for a designer to determine the dimensions of the variable thickness portion, which extends from the transition point 92 at the lower end of the constant thickness portion to the lower end 96 of the plunger-engaging segment 84. Because the designer is aware of the length of the variable thickness portion and the total compressive load carried by the sleeve, the designer is able to determine the necessary thickness of the variable thickness portion at any desired point of interest along the length 88 thereof by calculating the friction force exerted on the sleeve 30 in the region between the upper end of the plunger-engaging segment 84 and the point of interest, and by determining whether this friction force is greater than the force necessary to crush the above-mentioned region. Ideally, the variable-thickness portion of the sleeve is designed to have a wall thickness at each point along the length thereof which is just thick enough to support a compressive load equal to the friction force experienced by the region of the sleeve between the upper end 94 of the plunger-engaging segment 84 and the point of interest. In this manner, the wall of the sleeve is constructed to be only as thick as necessary in order to provide as much sensitivity as possible in the sleeve to pressure changes in the annular space 64.

As mentioned above, because the friction force is experienced gradually along the length of the sleeve 30, it would be ideal for the sleeve to have a thickness which gradually increases between the upper and lower ends 94, 96 of the segment 84 along the entire length thereof so as to withstand the progressively increasing resultant-compressive load acting on progressively larger axial regions of the sleeve 30. However, practical considerations such as present capabilities of forming very thin-walled stainless steel or aluminum sleeves prevents this ideal construction from being economical. Therefore, the above-described embodiment is employed as a more serviceable construction for carrying out the invention.

Although the invention has been described with reference to the above-described preferred embodiment, it is understood that substitutions may be made and equivalents employed herein without departing from the scope of the invention as recited in the claims.

What is claimed is:

1. For use in a hydraulic work support apparatus including a plunger axially movable between a loaded position and an unloaded position, the plunger being adapted to support a compressive load at one axial end thereof, and a plunger retaining means for retaining the plunger in the loaded position, the plunger retaining means including a tubular sleeve provided with a plunger-engaging segment having a first end adjacent the one axial end of the plunger and a second end remote from the first end, and means for forcing the plunger-engaging segment radially inward into pressing contact with the plunger to exert a friction force on the plunger which prevents the plunger from moving while in the loaded position, the friction force experienced by the sleeve when pressing contact exists between the sleeve and the plunger having a minimum magnitude at the first end of the plunger-engaging segment and a progressively larger magnitude toward the second end of the segment, the improvement comprising:

the tubular sleeve including a wall having a thickness which increases between a minimum thickness at the first end of the segment and a maximum thickness at the second end of the segment, the increase in the thickness of the sleeve being representative of the increase in the magnitude of the friction force experienced by the sleeve between the first and second ends of the plunger-engaging segment.

2. The work support apparatus in accordance with claim 1, wherein the wall of the plunger-engaging segment includes a constant-thickness portion between the first end of the segment and a point intermediate the first and second ends of the segment, and a variable-thickness portion extending between the intermediate point and the second end of the segment.

3. The work support apparatus in accordance with claim 2, wherein the first portion extends along substantially two-thirds of the length of the plunger-engaging segment and the second portion extends along substantially one-third of the length of the plunger-engaging segment.

4. The work support apparatus in accordance with claim 1, wherein the plunger-retaining means includes a base and a housing defining an open cylindrical space having a bottom wall and a side wall, the tubular sleeve including an upper annular flange contacting the side wall of the cylindrical space and a lower annular flange contacting the side wall of the cylindrical space, an annular space being defined between the tubular sleeve and the housing and between the upper and lower annular flanges.

5. The work support apparatus in accordance with claim 4, wherein the base includes an oil passage, the lower flange including an orifice extending in the axial direction of the tubular sleeve between the annular space and the oil passage in order to permit oil passing through the passage to enter the annular space to force the plunger-engaging segment against the plunger.

6. The work support apparatus in accordance with claim 1, wherein the plunger retaining means includes a base having a recess defining a bottom wall and a side wall, a cylindrical housing having a central bore and a threaded-end portion, the side wall being threaded to receive the threaded-end portion of the housing, and a first sealing element disposed between the base and the housing, the tubular sleeve being received in the central bore of the housing.

7. The work support apparatus in accordance with claim 6, wherein the bottom wall of the base includes an annular groove in which the housing and the tubular sleeve are received, the apparatus further including a second sealing element between the sleeve and the base.

8. The work support apparatus in accordance with claim 7, wherein the bottom wall of the recess defines a lower limit of travel of the plunger, the base further including an air-inlet passage opening into the recess through the bottom wall for permitting air to enter the recess to move the plunger between the unloaded and loaded positions.

9. The work support apparatus in accordance with claim 1, wherein the wall of the plunger-engaging segment includes a first constant thickness portion extending between the first end of the segment and a point intermediate the first and second ends of the segment, and a second constant thickness portion extending between the intermediate point and the second end of the segment, the second constant thickness portion being of a thickness larger than the thickness of the first constant thickness portion.

10. The work support apparatus in accordance with claim 1, wherein the sleeve is formed of stainless steel.

11. The work support apparatus in accordance with claim 1, wherein the sleeve is formed of aluminum.

12. The work support apparatus in accordance with claim 2, wherein the intermediate point is defined as the point along the length of the sleeve at which the magnitude of the compressive force experienced by the constant-thickness portion of the sleeve upon application of a predetermined maximum compressive load to the plunger is slightly less than the crushing force, wherein the crushing force is defined as the force necessary to crush a sleeve having a length equal to the distance between the first end of the plunger-engaging segment and the intermediate point and a constant-thickness equal to the thickness of the constant-thickness portion.

13. The work support apparatus in accordance with claim 9, wherein the intermediate point is defined as the point along the length of the sleeve at which the magnitude of the compressive force experienced by the constant-thickness portion of the sleeve upon application of a predetermined maximum compressive load to the plunger is slightly less than the crushing force, wherein the crushing force is defined as the force necessary to crush a sleeve having a length equal to the distance between the first end of the plunger-engaging segment and the intermediate point and a constant-thickness equal to the thickness of the constant-thickness portion.

* * * * *